(12) United States Patent
Matsumoto et al.

(10) Patent No.: US 8,534,738 B2
(45) Date of Patent: Sep. 17, 2013

(54) DOOR HOLE COVER AND VEHICULAR DOOR STRUCTURE

(75) Inventors: Mitsuo Matsumoto, Ibaraki (JP); Katsuhiko Tachibana, Ibaraki (JP); Daisuke Tsuchiya, Ibaraki (JP); Eiji Matsuda, Ibaraki (JP); Kazuyuki Yagura, Ibaraki (JP); Yuki Kagehisa, Ibaraki (JP); Natsuko Kagehisa, legal representative, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/381,805

(22) PCT Filed: Jul. 1, 2010

(86) PCT No.: PCT/JP2010/061247
§ 371 (c)(1),
(2), (4) Date: Dec. 30, 2011

(87) PCT Pub. No.: WO2011/002056
PCT Pub. Date: Jan. 6, 2011

(65) Prior Publication Data
US 2012/0169083 A1 Jul. 5, 2012

(30) Foreign Application Priority Data

Jul. 3, 2009 (JP) .................................. 2009-159045
Jun. 23, 2010 (JP) .................................. 2010-143025

(51) Int. Cl.
*B60J 5/00* (2006.01)

(52) U.S. Cl.
USPC .......................................... 296/39.3; 296/146.1

(58) Field of Classification Search
USPC ................... 296/191, 39.1, 39.3, 154, 146.1, 296/146.5; 49/502
See application file for complete search history.

(56) References Cited

U.S. PATENT DOCUMENTS

| | | | | |
|---|---|---|---|---|
| 5,094,318 | A * | 3/1992 | Maeda et al. | 181/290 |
| 5,773,375 | A | 6/1998 | Swan et al. | |
| 5,961,904 | A | 10/1999 | Swan et al. | |
| 6,983,822 | B2 * | 1/2006 | O'Regan et al. | 181/290 |
| 7,364,218 | B2 * | 4/2008 | Radu et al. | 296/146.7 |
| 7,585,559 | B2 * | 9/2009 | Schroeder et al. | 428/319.1 |
| 2003/0001408 | A1 * | 1/2003 | Hockenberry et al. | 296/146.7 |
| 2006/0012218 | A1 * | 1/2006 | Hockenberry et al. | 296/146.7 |
| 2007/0020812 | A1 * | 1/2007 | Hsu et al. | 438/119 |
| 2007/0228770 | A1 | 10/2007 | Kita et al. | |
| 2009/0277716 | A1 * | 11/2009 | Eadara et al. | 181/290 |
| 2010/0066121 | A1 * | 3/2010 | Gross | 296/146.5 |
| 2011/0293892 | A1 * | 12/2011 | Ogawa et al. | 428/172 |

FOREIGN PATENT DOCUMENTS

| | | |
|---|---|---|
| JP | 63-069850 A | 3/1988 |
| JP | 2000-511244 A | 8/2000 |
| JP | 2007-261424 A | 10/2007 |
| JP | 2007-290684 A | 11/2007 |
| JP | 2008-012993 A | 1/2008 |

* cited by examiner

*Primary Examiner* — Jason S Morrow
(74) *Attorney, Agent, or Firm* — Sughrue Mion, PLLC (57) ABSTRACT

A door hole cover which is intended to be attached to a door inner panel of a vehicle to cover an opening formed in the door inner panel, and which has an average of loss coefficients at frequencies of 150 Hz or less of 0.085 or more.

4 Claims, 2 Drawing Sheets

DOOR HOLE COVER AND VEHICULAR DOOR STRUCTURE

CROSS REFERENCE TO RELATED APPLICATION

This application claims priority based on Japanese Patent Application No. 2009-159045 filed Jul. 3, 2009, and Japanese Patent Application No. 2010-143025 filed Jun. 23, 2010, the contents of which are incorporated herein by reference in their entirety.

TECHNICAL FIELD

The present invention relates to a door hole cover and a vehicular door structure, and more particularly to a door hole cover for covering an opening in a vehicular door inner panel and a vehicular door structure provided therewith.

BACKGROUND ART

In conventional door structures of automobiles, a door inner panel is provided with an opening formed for work and a door hole cover which covers the opening in order to prevent water from penetrating from the opening.

However, in such door structure, due to vibration of the door inner panel or pneumatic vibration caused by vibration of a vehicular body or by vibration from a door speaker, the door hole cover itself generates vibration sound (abnormal sound) such as fluttering or chattering sounds.

In order to suppress such vibration sound, it has been proposed, for example, to partially form a plurality of beads which expand in their thickness directions, on an opposite section facing an opening in the door hole cover (see, for example, the following Patent Document 1). In Patent Document 1, the rigidity of the opposite section is improved, to thereby suppress the vibration sound generated from the bead formed portions.

Further, in order to suppress an interference sound generated when the vibrating door hole cover interferes with the door inner panel, it has been proposed, for example, to partially laminate a damping material which is made of foamed rubber material based on EPDM, on a surface of an opposite section facing an opening in the door hole cover (see, for example, the following Patent Document 2).

[Patent Document 1] Japanese Unexamined Patent Publication No. 2007-290684
[Patent Document 2] Japanese Unexamined Patent Publication No. 2008-12993

DISCLOSURE OF THE INVENTION

Problems to be Solved

However, in the door hole cover of the above Patent Document 1, vibration sound disadvantageously generates in a low-rigid portion other than the bead formed portions.

In the door hole cover of the above Patent Document 1, the optimization for the bead forming positions is needed and further, molding process for forming the beads is separately required corresponding to the shape and the position of opening in various vehicles, so that these operations are time-consuming and troublesome, resulting in increase in cost.

In the door hole cover of the above Patent Document 2, even if the interference sound with the door inner panel can be suppressed, the vibration sound (abnormal sound) directly generated from the door hole cover cannot be suppressed.

It is an object of the present invention to provide a door hole cover and a vehicular door structure, which can reliably suppress vibration sound generated from the door hole cover, simply and at low cost.

Means for Solving the Problem

To achieve the above object, the door hole cover of the present invention is intended to be attached to a door inner panel of a vehicle to cover an opening formed in the door inner panel, and has an average of loss coefficients at frequencies of 150 Hz or less of 0.085 or more.

It is preferable that the door hole cover of the present invention includes a base material made of polypropylene resin; and a viscoelastic layer laminated on at least one side of the base material.

In the door hole cover of the present invention, it is preferable that the polypropylene resin is non-stretched polypropylene resin.

In the door hole cover of the present invention, it is preferable that the viscoelastic layer is made of rubber composition and that the rubber composition is made of acrylic rubber.

In the door hole cover of the present invention, it is preferable that the viscoelastic layer is made of acrylic adhesive composition.

The vehicular door structure of the present invention includes a door inner panel having an opening; and the above-mentioned door hole cover attached to cover the opening.

Effect of the Invention

In the door hole cover and the vehicular door structure including the same according to the present invention, since the door hole cover itself has a vibration damping property, the vibration sound generated from the door hole cover can be reliably suppressed.

Further, the vibration damping property of the door hole cover itself can eliminate the need for optimizing the bead forming positions and for molding process of the beads corresponding to the opening in the door inner panel. Therefore, the vibration sound generated from the door hole cover can be suppressed simply and at low cost.

EMBODIMENT OF THE INVENTION

Figure 1:
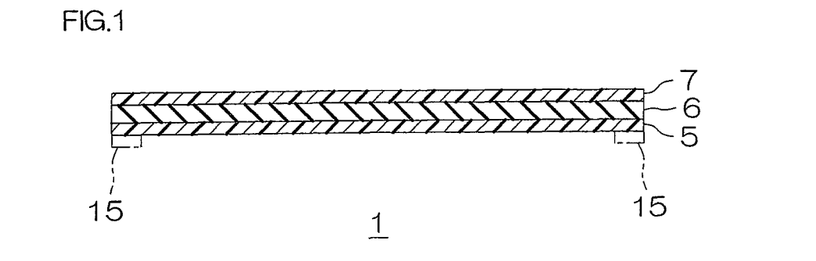
FIG. 1 shows a sectional view of one embodiment (a mode having a three-layer laminated structure) of a door hole cover according to the present invention.
Figure 2:
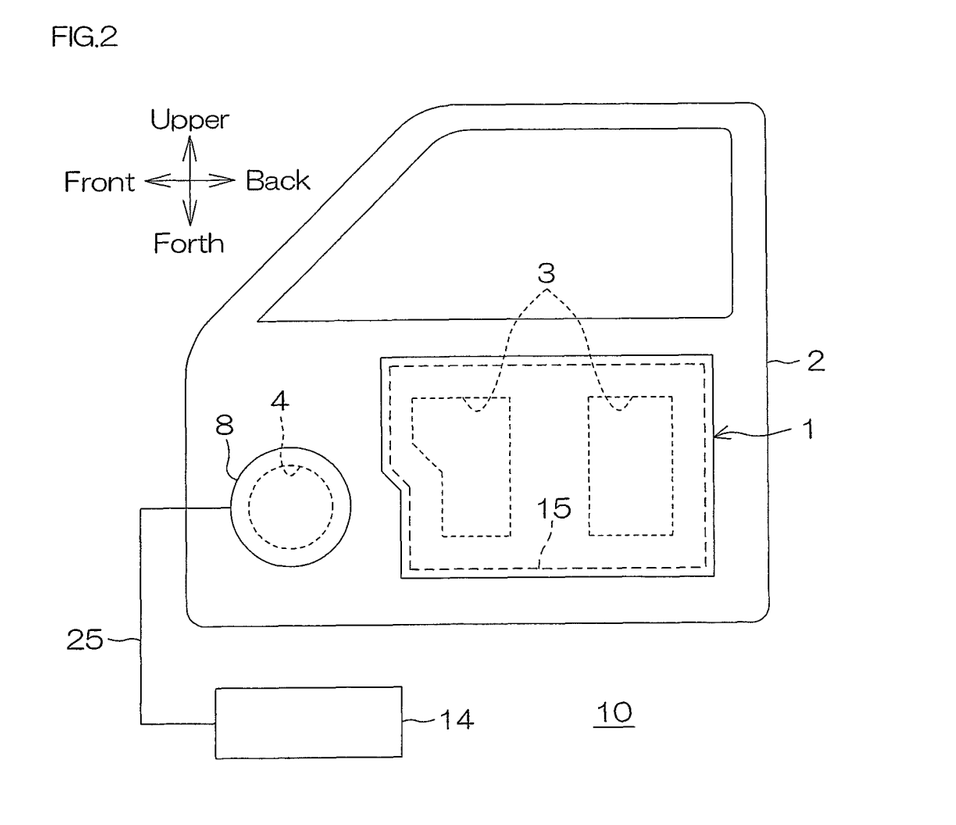
FIG. 2 shows a front view of one embodiment of a door structure according to the present invention, where the door hole cover shown in FIG. 1 is attached.

FIG. 1 shows a sectional view of one embodiment (a mode having a three-layer laminated structure) of a door hole cover according to the present invention, and FIG. 2 shows a front view of one embodiment of a door structure according to the present invention, where the door hole cover shown in FIG. 1 is attached.

In FIGS. 1 and 2, the door hole cover 1 is a door hole cover (or referred to as a sealing screen or a hole seal) which is intended to be attached to a door inner panel 2 of an automobile as a vehicle to cover a working hole 3 as an opening formed in the door inner panel 2.

The door hole cover 1 has, for example, a flat sheet-like shape and includes a first base material 5 serving as a base material, a viscoelastic layer (a first viscoelastic layer) 6 laminated on a surface of the first base material 5, and a second base material 7 serving as a base material laminated on a surface of the viscoelastic layer 6, as shown in FIG. 1.

The first base material 5 is formed as, for example, a synthetic resin film, and as a synthetic resin material for forming the synthetic resin film, for example, polyolefin resin such as polypropylene resin, polyethylene resin, and copolymer resin of monomers thereof may be used. Examples of the synthetic resin material also include polyurethane resin, polyvinyl chloride resin, and polyamide resin.

As the synthetic resin material, polyolefin resin is preferable.

The polypropylene resin is a polymer of a monomer component which predominantly contains propylene, and examples thereof include polypropylene (homopolypropylene), a copolymer of propylene with one kind or two or more kinds of other α-olefin, a copolymer of propylene with one kind or two or more kinds of (meth)acrylic ester, and mixtures thereof.

The above-mentioned polypropylene resin is classified into stretched polypropylene resin (OPP) which is stretched during production, and non-stretched polypropylene resin (CPP) which is not stretched during production.

The polyethylene resin is a polymer of a monomer component which predominantly contains ethylene, and examples thereof include polyethylene (homopolyethylene such as high density polyethylene, medium density polyethylene, low density polyethylene (specifically, linear low density polyethylene, branched low density polyethylene, etc.), and very low density polyethylene); copolymer of ethylene with one kind or two or more kinds of other α-olefin (except propylene); copolymer of ethylene with one kind or two or more kinds of (meth)acrylic ester (e.g., ethylene ethyl acrylate copolymer, etc.); and ethylene-vinyl acetate copolymer.

The copolymer resin is an olefin copolymer, and specifically, an ethylene propylene copolymer, and more specifically, a random or a block copolymer of ethylene and propylene may be used.

As the synthetic resin material, polypropylene resin is more preferable, or non-stretched polypropylene resin (CPP) is even more preferable.

When the synthetic resin material is stretched polypropylene resin (OPP), not only breaking strength but also vibration characteristics may differ between a machine direction (a direction in which the synthetic resin material flows during molding; hereinafter referred to as MD direction in some cases) of the synthetic resin material and a widthwise direction (a direction perpendicular to the machine direction; hereinafter referred to as TD direction in some cases) thereof, depending on the stretching direction. Therefore, it is necessary to consider the stretching direction when the door hole cover 1 is processed into a specific shape.

On the other hand, when the synthetic resin material is non-stretched polypropylene resin (CPP), not only breaking strength but also vibration characteristics can be kept constant regardless of the shape of the door hole cover 1.

When transparency does not need to be imparted to the door hole cover 1, the first base material 5 can be formed as, for example, a metal foil, a nonwoven fabric, and a woven fabric (cloth).

The thickness of the first base material 5 is appropriately selected so that an average DF (described later) of loss coefficients of the door hole cover 1 may be within the desired range, and is, for example, from 0.01 to 0.5 mm, preferably from 0.02 to 0.2 mm, or more preferably from 0.03 to 0.1 mm.

The viscoelastic layer 6 is formed on the entire surface of the first base material 5.

As the viscoelastic material for forming the viscoelastic layer 6, for example, a rubber composition may be used.

Examples of the rubber composition include acrylic rubber, silicone rubber, polyurethane rubber, vinyl alkyl ether rubber, polyvinyl alcohol rubber, polyvinyl pyrrolidone rubber, polyacrylamide rubber, cellulose rubber, natural rubber, butadiene rubber, chloroprene rubber, styrene-butadiene rubber, acrylonitrile-butadiene rubber, styrene ethylene butadiene styrene rubber (SEBS), styrene isoprene styrene rubber (SIS), isoprene rubber, styrene butadiene styrene rubber (SBS), polyisobutylene rubber, and butyl rubber.

As the rubber composition, acrylic rubber is preferable from the viewpoint of forming a laminated structure of the first base material 5 and the second base material 7 to increase the average DF of loss coefficients of the door hole cover 1.

The acrylic rubber is a polymer of a monomer component which predominantly contains alkyl(meth)acrylate such as methyl(meth)acrylate or butyl(meth)acrylate.

When transparency does not need to be imparted to the door hole cover 1, butyl rubber may be preferably used as the rubber composition.

The butyl rubber is a synthetic rubber obtained by random or block copolymerization of isobutene (isobutylene) and isoprene. The butyl rubber has a degree of unsaturation of, for example, 0.8 to 2.2, or preferably 1.0 to 2.0.

As the viscoelastic material for forming the viscoelastic layer 6, for example, an acrylic adhesive composition may also be used.

The acrylic adhesive composition contains an acrylic polymer.

The acrylic polymer is obtained by polymerizing a monomer composition containing 50% by mass or more of alkyl (meth)acrylate having an alkyl group of 4 carbon atoms or more, and 50% by mass or less of copolymerizable monomer copolymerizable with alkyl(meth)acrylate (i.e., the remainder of the alkyl(meth)acrylate).

Specific examples of the alkyl(meth)acrylate (an alkyl methacrylate or an alkyl acrylate) having an alkyl group of 4 carbon atoms or more include alkyl(meth)acrylate monomers having an alkyl group of 4 to 8 carbon atoms, such as butyl (meth)acrylate, pentyl(meth)acrylate, hexyl(meth)acrylate, octyl(meth)acrylate, and 2-ethylhexyl(meth)acrylate.

Examples of the copolymerizable monomer include carboxyl group-containing monomers such as (meth)acrylic acid; hydroxyl group-containing monomers such as 2-hydroxyethyl(meth)acrylate; amide group-containing monomers such as (meth)acrylamide; and (meth)acrylic group-containing silane coupling agents such as γ-acryloxypropyltrimethoxysilane. Of these, carboxyl group-containing monomers and (meth)acrylic group-containing silane coupling agents are preferable.

The method for polymerizing the monomer composition is not particularly limited, and a known polymerization method such as solution polymerization, bulk polymerization, emulsion polymerization, or various radical polymerizations may be used. Of these, emulsion polymerization is preferable.

The obtained acrylic polymer may be, for example, any of a random copolymer, a block copolymer, and a graft copolymer.

The acrylic adhesive composition contains a known additive such as a crosslinking agent or a tackifier as required.

The form of the acrylic adhesive composition may preferably include a solvent-free emulsion form and a hot melt form. The acrylic adhesive composition in the above form can be suitably used as interior materials for vehicles.

With the acrylic adhesive composition, adhesion characteristics depending on the kind of the base material or vibration characteristics under high temperature atmosphere can be easily designed.

The thickness of the viscoelastic layer 6 is appropriately selected so that the average DF of loss coefficients of the door hole cover 1 may be within the desired range, and is, for example, from 0.01 to 1 mm, preferably from 0.01 to 0.6 mm, or more preferably from 0.02 to 0.4 mm.

The second base material 7 is formed on the entire surface of the viscoelastic layer 6 and sandwiches the viscoelastic layer 6 with the first base material 5 in the thickness direction.

As the material for forming the second base material 7, the same material as that used for forming the first base material 5 may be used.

The second base material 7 has the same thickness as the first base material 5.

The door hole cover 1 has a thickness of, for example, 0.02 to 4 mm, and from the viewpoint of the following property to the door inner panel 2, the thickness thereof is preferably from 0.03 to 0.8 mm, or more preferably from 0.05 to 0.6 mm.

As the preferable combination of the materials that form the first base material 5, the viscoelastic layer 6, and the second base material 7, a combination of polypropylene resin serving as the material of the first base material 5 and the second base material 7, and acrylic rubber serving as the material of the viscoelastic layer 6 may be used.

The door hole cover 1 has an average DF of loss coefficients at frequencies of 150 Hz or less (specifically, frequencies ranging from 20 to 150 Hz) at room temperature of 0.085 or more, preferably 0.095 or more, more preferably, 0.100 or more, and usually 2.000 or less. Further, the average DF of loss coefficients at frequencies of 150 Hz or less at room temperature can be set to preferably, 0.120 or more, more preferably 0.150 or more and, for example, 1.500 or less.

The above-mentioned room temperature ranges, for example, from 20 to 25° C., and specifically 23° C.

Regarding the door hole cover 1, the average DF of loss coefficients can be calculated by the measuring method described in Example to be described later.

However, when the door hole cover 1 is excessively soft, the entire door hole cover 1 does not easily vibrate, which makes it difficult to calculate the average DF of loss coefficients by the measuring method (a method using a frequency response function) described in Example. In such case, the average DF of loss coefficients at frequencies of 150 Hz or less may be calculated using a viscoelasticity spectrometer.

When the average DF of loss coefficients (at frequencies of 150 Hz or less) of the door hole cover 1 is less than the above range, the vibration sound generated from the door hole cover 1 cannot be reliably suppressed.

Exemplified below are preferred combinations of materials and thicknesses of the first base material 5, the viscoelastic layer 6, and the second base material 7 for setting the loss coefficient (at frequencies of 150 Hz or less) DF of the door hole cover 1 in the above range.

<Combination 1>
First base material 5 Material: Polypropylene resin, thickness of 0.01-0.5 mm
Viscoelastic layer 6 Material: Acrylic rubber, thickness of 0.01-1 mm
Second base material 7 Material: Polypropylene resin, thickness of 0.01-0.5 mm <Combination 2>
First base material 5 Material: Polypropylene resin, thickness of 0.01-0.5 mm
Viscoelastic layer 6 Material: Acrylic rubber, thickness of 0.01-1 mm
Second base material 7 Material: Polyethylene resin, thickness of 0.01-0.5 mm <Combination 3>
First base material 5 Material: Polypropylene resin, thickness of 0.01-0.5 mm
Viscoelastic layer 6 Material: Butyl rubber, thickness of 0.01-1 mm
Second base material 7 Material: Polypropylene resin, thickness of 0.01-0.5 mm <Combination 4>
First base material 5 Material: Polypropylene resin, thickness of 0.01-0.5 mm
Viscoelastic layer 6 Material: Acrylic adhesive composition, thickness of 0.01-1 mm
Second base material 7 Material: Polypropylene resin, thickness of 0.01-0.5 mm To produce the door hole cover 1, first, the first base material 5 is prepared, the viscoelastic layer 6 is laminated on a surface thereof by coating, and the second base material 7 is then laminated on the surface of the viscoelastic layer 6.

Next, a door structure 10 of an automobile having the above-mentioned door hole cover 1 will be described with reference to FIG. 2. In FIG. 2, the left-and-right direction of the paper plane will be referred to as a "front-and-rear direction", the up-and-down direction of the paper plane will be referred to as a "up-and-down direction", and the paper thickness direction of the paper plane will be referred to as a "vehicular width direction."

The door structure 10 includes a door inner panel 2 and a door hole cover 1 attached thereto.

The door inner panel 2 has an outer shape corresponding to an automotive front door and is made of, for example, a metal plate such as a steel plate. Such door inner panel 2 constitutes the automotive front door together with a door outer panel (not shown).

A window frame where a front side window is liftably fit is formed in the upper portion of the door inner panel 2, and a speaker hole 4 and a working hole 3 as an opening are formed in the lower portion thereof The speaker hole 4 is formed in order to accommodate a door speaker 8 and has, for example, a generally circular shape on the lower front side of the door inner panel 2.

On the back side of the speaker hole 4, one or more (e.g., two) working holes 3 are provided so as to be spaced apart from each other. Each of the working holes 3 is spaced in opposed relation to each other in the front-and-rear direction and is formed in a generally rectangular shape in elevational view being slightly oblong in the up-and-down direction. One of the two working holes 3, which is near the speaker hole 4, has its upper end portion slightly protruded toward the front side. Thus, a stepped portion corresponding to the speaker hole 4 is formed in the middle of the up-and-down direction of the front end portion of the working hole 3.

The door hole cover 1 is trimmed (cut) into a generally rectangular shape in elevational view extending in the front-and-rear direction so as to collectively cover the two working holes 3.

The door hole cover 1 has a length in the front-and-rear-direction of, for example, 480 mm.

The door hole cover 1 has a length in the up-and-down-direction of, for example, 550 mm.

The door hole cover 1 has its upper end portion protruded toward the front side so as to expose the speaker hole 4 and to correspond to the front end portion of the working hole 3.

In order to attach the door hole cover 1 to the door inner panel 2, first, the above-mentioned door hole cover 1 is prepared.

To prepare the door hole cover 1, first, a sheet-like shaped door hole cover 1 is trimmed (cut) into the above-mentioned shape so as to expose the speaker hole 4, to cover the two working holes 3, and to be continuous over these working holes 3.

As shown in phantom lines in FIGS. 1 and 2, an adhesive tape 15 is then laminated on the peripheral end of the back surface of the door hole cover 1.

The adhesive tape 15 has a narrow tape-like shape, and is continuously arranged along the peripheral end edge of the back surface of the first base material 5 of the door hole cover 1.

The adhesive composition that forms the adhesive tape 15 is not particularly limited and, for example, the above-mentioned butyl rubber may be used. The adhesive tape 15 has a thickness of, for example, 0.01 to 5 mm.

Subsequently, the door hole cover 1 is adhesively bonded to one side surface (internal side surface) of the door inner panel 2 in the vehicular width direction via the adhesive tape 15 so as to collectively cover the two working holes 3.

This attaches the door hole cover 1 to the door inner panel 2.

Thereafter, the door speaker 8 is accommodated in the speaker hole 4 and is then attached to the door inner panel 2. The door speaker 8 is electrically connected with a generator 14 through a wiring 25.

In the door hole cover 1 and the door structure 10 of an automobile including the same as described above, the door hole cover 1 itself has a vibration damping property, so that the vibration sound generated from the door hole cover 1 can be reliably suppressed.

Further, since the door hole cover 1 itself has a vibration damping property, the need for optimizing the forming positions of the beads and for molding process of the beads corresponding to the working holes 3 in the door inner panel 2 as described in Patent Document 1 can be eliminated.

Therefore, the vibration sound generated from the door hole cover 1 can be suppressed simply and at low cost.

In particular, when the combination of polypropylene resin and acrylic rubber is used as the combination of the materials that form the first base material 5 and the viscoelastic layer 6, the door hole cover 1, which has flexibility, can follow unevenness formed on the door inner panel 2 in the door structure 10.

When the first base material 5 and the second base material 7 are made of polyolefin resin and the viscoelastic layer 6 is made of acrylic rubber or acrylic adhesive composition, the door hole cover 1 has excellent transparency. This allows the adhesive tape 15 on the back surface of the door hole cover 1 to be reliably aligned with the door inner panel 2.

The door hole cover 1 has excellent mechanical strength, heat resistance, water resistance, and weather resistance equivalent to the door hole cover made of polyethylene resin film only.

In addition to the vibration sound suppression performance (vibration damping property), when acoustic performance (e.g., sound absorbency, sound insulation, etc.) need to be imparted to the door hole cover 1, a sound absorbing layer or a sound insulating material may be laminated on, for example, the surface and the back surface of the door hole cover 1 though not shown.

Though not shown, the door hole cover 1 may be formed in a two-layer laminated structure made of the first base material 5 and the viscoelastic layer 6 without providing the second base material 7.

Figure 3:
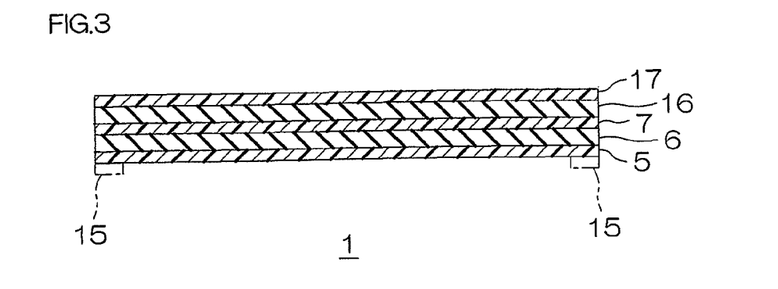
FIG. 3 shows a sectional view of another embodiment (a mode having a five-layer laminated structure) of a door hole cover according to the present invention.
Figure 4:
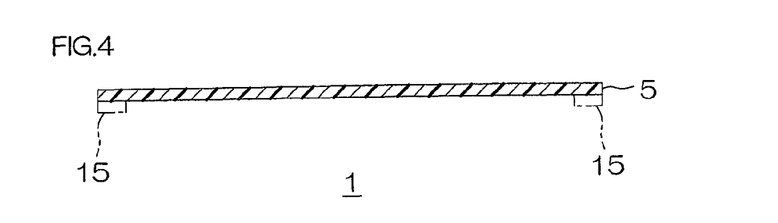
FIG. 4 shows a sectional view of another embodiment (a mode having a single layered structure) of a door hole cover according to the present invention.

FIG. 3 shows a sectional view of another embodiment (a mode having a five-layer laminated structure) of a door hole cover according to the present invention, and FIG. 4 shows a sectional view of another embodiment (a mode having a single layered structure) of a door hole cover according to the present invention. The same reference numerals are provided in each of the subsequent figures for members corresponding to each of those described above, and their detailed description is omitted.

In the description shown in the above FIG. 1, the door hole cover 1 is formed in a three-layer (laminated) structure. However, for example, as shown in FIG. 3, the door hole cover 1 may be formed in a five-layer (laminated) structure.

In FIG. 3, a second viscoelastic layer 16 as a viscoelastic layer is laminated on the surface of the second base material 7, and a third base material 17 as a base material is laminated on the surface thereof A viscoelastic material for forming the second viscoelastic layer 16 is the same as that used for forming the first viscoelastic layer 6. The second viscoelastic layer 16 has the same thickness as the first viscoelastic layer 6.

A material for forming the third base material 17 is the same as the one for forming the first base material 5. The third base material 17 has the same thickness as the first base material 5.

Exemplified below are preferred combinations of materials and thicknesses of the first base material 5, the first viscoelastic layer 6, the second base material 7, the second viscoelastic layer 16, and the third base material 17 for setting the average DF of loss coefficients (at frequencies of 150 Hz or less) of the door hole cover 1 in the above range.

<Combination 5>

First base material 5 Material: Polypropylene resin, thickness of 0.01-0.5 mm

First viscoelastic layer 6 Material: Acrylic rubber, thickness of 0.01-1 mm

Second base material 7 Material: Polypropylene resin, thickness of 0.01-0.5 mm Second viscoelastic layer 16 Material: Acrylic rubber, thickness of 0.01-1 mm Third base material 17 Material: Polypropylene resin, thickness of 0.01-0.5 mm <Combination 6>

First base material 5 Material: Polypropylene resin, thickness of 0.01-0.5 mm

First viscoelastic layer 6 Material: Acrylic adhesive composition, thickness of 0.01-1 mm Second base material 7 Material: Polypropylene resin, thickness of 0.01-0.5 mm Second viscoelastic layer 16 Material: Acrylic adhesive composition, thickness of 0.01-1 mm Third base material 17 Material: Polypropylene resin, thickness of 0.01-0.5 mm As shown in FIG. 4, the door hole cover 1 may be formed in a single-layer (monolayer) structure from the first base material 5 only, without forming the viscoelastic layer 6 and the second base material 7.

Exemplified below are preferred materials and thicknesses of the first base material 5 for setting the average DF of loss coefficients (at frequencies of 150 Hz or less) of the door hole cover 1 in the above range.

<Examples of Materials and Thicknesses of the First Base Material 5>

Material: Polypropylene resin, thickness of 0.03-1 mm
Material: Polyethylene resin, thickness of 0.1-1 mm Preferably, the door hole cover 1 is formed in a multilayer laminated structure including two or more layers. Compared with the case where the door hole cover 1 is formed in a single layer structure, the formation of the door hole cover 1 having a multilayer laminated structure can reliably increase the average DF of loss coefficients of the door hole cover 1, so that the average DF thereof can be reliably set in the above range.

EXAMPLES

While in the following, the present invention will be described in further detail with reference to Examples and Comparative Examples, the present invention is not limited to any of them.

1. PREPARATION OF ACRYLIC ADHESIVE COMPOSITION

Into a reaction vessel equipped with a condenser tube, a nitrogen introducing tube, a thermometer and a stirrer, 0.1 parts by mass of 2,2'-azobis[N-(2-carboxylethyl)-2-methyl-propionamidine] (a polymerization initiator, trade name: VA-057, manufactured by Wako Pure Chemicals Industries, Ltd.) and 35 parts by mass of ion exchange water were supplied and the mixture was stirred for 1 hour while nitrogen gas was introduced thereinto.

Using 2 parts by mass of polyoxyethylene sodium lauryl sulfate (an emulsifier, trade name: LATEMUL E-118B, manufactured by Kao Corporation), 30 parts by mass of butyl acrylate, 70 parts by mass of 2-ethylhexyl acrylate, 1.6 parts by mass of acrylic acid, 2.4 parts by mass of methacrylic acid, 0.02 parts by mass of γ-methacryloxypropyltrimethoxysilane (trade name: KBM-503, manufactured by Shin-Etsu Chemical Co., Ltd.), and 0.033 parts by mass of lauryl mercaptan (a chain transfer agent) were emulsified in 40 parts by mass of water to prepare a monomer composition (monomer emulsion).

The monomer composition was then added dropwise over 3 hours while the internal temperature of the reaction vessel was kept at 60° C.

After completion of the dropping of the monomer composition, the mixture was aged for 3 hours while maintaining the internal temperature. Subsequently, 0.1 parts by mass of ascorbic acid and 0.1 parts by mass of hydrogen peroxide solution (35%) were added into the reaction vessel, and the added mixture was cooled to room temperature, to thereby obtain an acrylic polymer emulsion (solid content: 56% by mass) having an acrylic polymer dispersed in water.

A polymerized rosin resin was added to the acrylic polymer emulsion so that 20 parts by mass of the solid content of the polymerized rosin resin (a tackifier, trade name: Super Ester E-865NT, softening point: 160° C., solid content: 50% by mass, manufactured by Arakawa Chemical Industries, Ltd.) was added to 100 parts by mass of the solid content of the acrylic polymer emulsion (i.e., acrylic polymer).

Thus, an acrylic adhesive composition was obtained.

2. EVALUATION METHOD (1) Determination of Loss Coefficient

Figure 5:
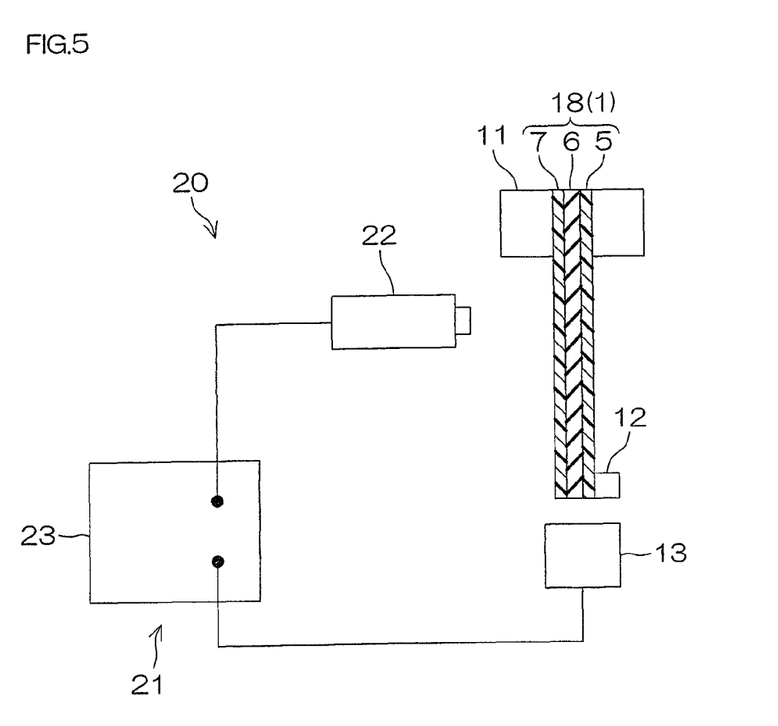
FIG. 5 shows a schematic view for explaining the evaluation method of the vibration sounds in Examples.

As shown in FIG. 5, a measuring apparatus includes a loss coefficient measuring device (20) provided with a clamp (11) and a laser Doppler vibrometer system (21).

The laser Doppler vibrometer system (21) includes an electromagnetic vibration exciter (13) provided under the clamp (11) at a spaced interval which allows a test piece (18) to hang, a vibrometer (22) spaced apart from the side of the hanging test piece (18) in the middle of the lengthwise direction, and a signal processing device (23) connected to the electromagnetic vibration exciter (13) and the vibrometer (22). The signal processing device (23) is configured with an FFT analyzer (part number "CF-5220", manufactured by Ono Sokki Co., Ltd.).

The following operations were carried out at 23° C.

First, the door hole cover (1) of each of Examples 1 to 9 and Comparative Examples 1 and 2 was cut into a piece having a size of 5 mm (width)×50 mm (length) to obtain a test piece (18).

Then, a 10-mm area from the lengthwise one end portion of the test piece (18) was held with the clamp (11). A piece of iron (12) having a size of 5 mm (length)×1 mm (width)×0.8 mm (thickness) was adhesively bonded to a 1-mm area from the lengthwise other end portion of the test piece (18) using an adhesive agent. The piece of iron (12) was adhesively bonded to the back surface of the first base material (5). The test piece (18) was then hung so that the lengthwise direction thereof lay along the up-and-down direction.

Thereafter, the laser Doppler vibrometer system (21) was operated so that an excitation signal (swept sine wave) outputted from the signal processing device (23) allowed the electromagnetic vibration exciter (13) to vibrate the piece of iron (12) and that the vibrometer (22) detected the vibration in the middle of the lengthwise direction of the test piece (18) and inputted a vibration (detection) signal into the signal processing device (23).

In the signal processing device (23), a frequency response function was calculated based on the excitation signal outputted to the electromagnetic vibration exciter (13) and the vibration signal inputted from the vibrometer (22). Using the frequency response function, the average DF of loss coefficients at frequencies of 150 Hz or less (20-150 Hz) was calculated by determining a resonant peak using curve fitting.

(2) Evaluation of Vibration Sound

In the door structure (10) (see FIG. 2) of each of Examples 1 to 9 and Comparative Examples 1 and 2, a 45-Hz sine wave signal was regenerated from the door speaker (8), vibration sound (abnormal sound) generated from the door hole cover (1) was measured with a microphone (part number "Type4190", manufactured by Bruel & Kjaer), and frequency analysis was conducted with an analyzer software (part number "Artems", manufactured by HEAD Acoustics).

With the frequency analysis, based on the vibration sound in the door hole cover (1) caused by a 45-Hz sine wave signal regenerated from the door speaker (8), a partial over all of the noise level (A-weighted sound pressure level) at frequencies of 1 kHz to 22 kHz including the vibration sound was calculated.

The frequency of the sine wave signal regenerated from the door speaker (8) was selected as follows.

Specifically, in order to vibrate (excite and vibrate) the door inner panel (2), it was necessary to regenerate the sine wave signal from the door speaker (8) at a frequency at which the door hole cover (1) usually tended to generate the vibration sound, that is, nearly at a natural frequency of the door inner panel (2). Since the natural frequency of the door inner panel (2) varied depending on the shape and material of the door inner panel (2), the sine wave signal was continuously regenerated at frequencies ranging from 20 to 150 Hz. As a result, a frequency of 45 Hz was selected as the frequency at which the door inner panel (2) vibrated (excited and vibrated) largely and the door hole cover (1) tended to generate the vibration sound.

In Comparative Example 3, a vibration sound in the door structure (10) in which the door hole cover (1) was not provided was measured in the same manner as above.

3. EXAMPLES AND COMPARATIVE EXAMPLES

Example 1

A 0.07 mm-thick first base material made of uniaxial-lateral-stretching polypropylene film, a 0.028 mm-thick viscoelastic layer made of acrylic rubber, and a 0.06 mm-thick second base material made of biaxial-stretching polypropylene film were sequentially laminated, so that a 0.158 mm-thick door hole cover having a three-layer laminated structure was produced (see FIG. 1).

The door hole cover was then cut into a generally rectangular shape in elevational view with its upper end portion being protruded toward the front side. At this time, the door hole cover was adjusted so that the widthwise direction (TD direction) of the door hole cover lay along the up-and-down direction when attached to the door. Subsequently, a 5 mm-thick adhesive tape made of butyl rubber was continuously laminated on the peripheral end of the back surface thereof (the back surface of the first base material).

A door inner panel having a speaker hole and two working holes was separately prepared.

Subsequently, the door hole cover was adhesively bonded to the internal side surface of the door inner panel via the adhesive tape so as to expose the speaker hole and to cover two working holes. This attached the door hole cover to the door inner panel (see FIG. 2).

Example 2

A single-layer (monolayer) structured door hole cover was prepared using a 0.10 mm-thick first base material alone made of polypropylene film (see FIG. 4).

The door hole cover was then attached to the door inner panel in the same manner as in Example 1 (see FIG. 2).

Example 3

A 0.188 mm-thick door hole cover having a three-layer laminated structure was produced (see FIG. 1), followed by attachment of the door hole cover to the door inner panel (see FIG. 2) in the same manner as in Example 1 except that a 0.09 mm-thick second base material of polyethylene resin was used instead of the 0.06 mm-thick second base material made of biaxial-stretching polypropylene film.

Example 4

A 0.178 mm-thick door hole cover having a three-layer laminated structure was produced (see FIG. 1), followed by attachment of the door hole cover to the door inner panel (see FIG. 2) in the same manner as in Example 1 except that a 0.06 mm-thick first base material made of biaxial-stretching polypropylene film was used instead of the 0.07 mm-thick first base material made of uniaxial-lateral-stretching polypropylene film and that a 0.09 mm-thick second base material made of polyethylene resin was used instead of the 0.06 mm-thick second base material made of polypropylene resin.

Example 5

A 0.148 mm-thick door hole cover having a three-layer laminated structure was produced (see FIG. 1), followed by attachment of the door hole cover to the door inner panel (see FIG. 2) in the same manner as in Example 1 except that a 0.06 mm-thick first base material made of biaxial-stretching polypropylene film was used instead of the 0.07 mm-thick first base material made of uniaxial-lateral-stretching polypropylene film.

Example 6

A 0.148 mm-thick door hole cover having a three-layer laminated structure was produced (see FIG. 1), followed by attachment of the door hole cover to the door inner panel (see FIG. 2) in the same manner as in Example 5 except that during the cutting of the door hole cover, the door hole cover was adjusted so that the machine direction (MD direction) of the door hole cover lay along the up-and-down direction when the door hole cover was attached to the door.

Example 7

A 0.220 mm-thick door hole cover having a three-layer laminated structure was produced (see FIG. 1), followed by attachment of the door hole cover to the door inner panel (see FIG. 2) in the same manner as in Example 5 except that the 0.100 mm-thick viscoelastic layer made of acrylic adhesive composition prepared above was used instead of the 0.028 mm-thick viscoelastic layer made of acrylic rubber.

Example 8

A 0.220 mm-thick door hole cover having a three-layer laminated structure was produced (see FIG. 1), followed by attachment of the door hole cover to the door inner panel (see FIG. 2) in the same manner as in Example 7 except that 0.06 mm-thick first and second base materials made of non-stretched polypropylene film were used instead of the 0.06 mm-thick first and second base materials made of biaxial-stretching polypropylene.

Example 9

A 0.220 mm-thick door hole cover having a three-layer laminated structure was produced (see FIG. 1), followed by attachment of the door hole cover to the door inner panel (see FIG. 2) in the same manner as in Example 8 except that during the cutting of the door hole cover, the door hole cover was adjusted so that the machine direction (MD direction) of the door hole cover lay along the up-and-down direction when the door hole cover was attached to the door.

Comparative Example 1

A single-layer (monolayer) structured door hole cover was prepared (see FIG. 4), followed by attachment of the door hole cover to the door inner panel (see FIG. 2) in the same manner as in Example 2 except that a 0.09 mm-thick first base material (commercially available product) made of polyethylene resin was used instead of the 0.10 mm-thick first base material made of polypropylene resin.

Comparative Example 2

A single-layer (monolayer) structured door hole cover was prepared (see FIG. 4), followed by attachment of the door hole cover to the door inner panel (see FIG. 2) in the same manner as in Example 2 except that a 0.07 mm-thick first base material made of polypropylene resin was used instead of the 0.10 mm-thick first base material made of polypropylene resin.

TABLE 1

| | | Ex. & Comp. Ex. | | | | | | |
|---|---|---|---|---|---|---|---|---|
| | | Ex. 1 | Ex. 2 | Ex. 3 | Ex. 4 | Ex. 5 | Ex. 6 | Ex. 7 |
| 1st Base Material | Material | OPP (*1) | OPP (*2) | OPP (*1) | OPP (*3) | OPP (*3) | OPP (*3) | OPP (*3) |
| | Thickness (mm) | 0.07 | 0.10 | 0.07 | 0.06 | 0.06 | 0.06 | 0.06 |
| Viscoelastic Layer | Material | Acrylic Rubber | — | Acrylic Rubber | Acrylic Rubber | Acrylic Rubber | Acrylic Rubber | Acrylic Adhesive |
| | Thickness (mm) | 0.028 | | 0.028 | 0.028 | 0.028 | 0.028 | 0.100 |
| 2nd Base Material | Material | OPP (*3) | — | PE (*5) | PE (*5) | OPP (*3) | OPP (*3) | OPP (*3) |
| | Thickness (mm) | 0.06 | | 0.09 | 0.09 | 0.06 | 0.06 | 0.06 |
| Door Hole Cover | Layer Structure | Three Layers | Single Layer | Three Layers | Three Layers | Three Layers | Three Layers | Three Layers |
| | Thickness (mm) | 0.158 | 0.100 | 0.188 | 0.178 | 0.148 | 0.148 | 0.220 |
| | Average DF of Loss Coefficients* | 0.178 | 0.140 | 0.130 | 0.102 | 0.165 | 0.124 | 0.172 |
| | Up-and-Down Direction at Attachment | TD | TD | TD | TD | TD | MD | TD |
| Vibration Sound h Door Hole Cover | Partial Over All dB (A) | 45.7 | 48.3 | 48.5 | 50.8 | 46.3 | 50.3 | 46.0 |
| | Difference dB (A) from Comp. Ex. 3 | −5.6 | −3.0 | −2.8 | −0.5 | −5.0 | −1.0 | −5.3 |

| | | Ex. & Comp. Ex. | | | | |
|---|---|---|---|---|---|---|
| | | Ex. 8 | Ex. 9 | Comp. Ex. 1 | Comp. Ex. 2 | Comp. Ex. 3 |
| 1st Base Material | Material | CPP (*4) | CPP (*4) | PE (*5) | OPP (*1) | (Door Hole Cover Not Provided) |
| | Thickness (mm) | 0.06 | 0.06 | 0.09 | 0.07 | |
| Viscoelastic Layer | Material | Acrylic Adhesive | Acrylic Adhesive | — | — | |
| | Thickness (mm) | 0.100 | 0.100 | | | |
| 2nd Base Material | Material | CPP (*4) | CPP (*4) | — | — | |
| | Thickness (mm) | 0.06 | 0.06 | | | |
| Door Hole Cover | Layer Structure | Three Layers | Three Layers | Single Layer | Single Layer | |
| | Thickness (mm) | 0.220 | 0.220 | 0.090 | 0.070 | |
| | Average DF of Loss Coefficients* | 0.167 | 0.159 | 0.083 | 0.068 | |
| | Up-and-Down Direction at Attachment | TD | MD | TD | TD | |

TABLE 1-continued

| | | | | | | |
|---|---|---|---|---|---|---|
| Vibration Sound h Door Hole Cover | Partial Over All dB (A) | 46.2 | 47.6 | 56.3 | 61.3 | 51.3 |
| | Difference dB (A) from Comp. Ex. 3 | −5.1 | −3.7 | 5.0 | 10.0 | — |

Average DF of Loss Coefficients*: (Frequencies of 20-150 Hz, 23° C.)
The abbreviations in Table 1 are shown in detail below.
(*1) Uniaxial-lateral-stretching polypropylene film (trade name: Pylen OT P4748, manufactured by Toyobo Co., Ltd.)
(*2) Polypropylene film (trade name: P-3300, manufactured by Kurabo Industries, Ltd.)
(*3) Biaxial-stretching polypropylene film (trade name: TRAYFAN BO2548, Toray Industries, Inc., breaking strength (MD): 140 MPa, breaking strength (TD): 300 MPa)
(*4) Non-stretched polypropylene film (trade name: Alomar ET20, OKAMOTO INDUSTRIES, INC.)
(*5) Polyethylene resin film (material: low-density polyethylene, trade name "NOVATEC LL", manufactured by Japan Polyethylene Corporation)

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The door hole cover and the vehicular door structure of the present invention are used in order to cover an opening in a vehicular door inner panel.

The invention claimed is:

1. A door hole cover intended to be attached to a door inner panel of a vehicle to cover an opening formed in the door inner panel comprising:
   a base material made of a polyolefin resin and having a thickness of 0.01 to 0.5 mm; and
   a viscoelastic layer laminated on at least one side of the base material, the viscoelastic layer being made of a rubber composition or of an acrylic adhesive composition and having a thickness of 0.01 to 1 mm,
   wherein the door hole cover has an average of loss coefficients at frequencies of 150 Hz or less of 0.085 or more.

2. The door hole cover according to claim 1, wherein the polyolefin resin is non-stretched polypropylene resin.

3. The door hole cover according to claim 1, wherein the rubber composition is made of acrylic rubber.

4. A vehicular door structure comprising:
   a door inner panel having an opening; and
   a door hole cover attached to cover the opening and having an average of loss coefficients at frequencies of 150 Hz or less of 0.085 or more,
   the door hole cover comprising:
   a base material made of polyolefin resin and having a thickness of 0.01 to 0.5 mm; and
   a viscoelastic layer laminated on at least one side of the base material, the viscoelastic layer being made of a rubber composition or of an acrylic adhesive composition and having a thickness of 0.01 to 1 mm.

* * * * *